(12) United States Patent
Brookes et al.

(10) Patent No.: US 11,174,721 B2
(45) Date of Patent: Nov. 16, 2021

(54) METHOD AND SYSTEM FOR COLLECTING AND MANAGING REMOTE SENSOR DATA

(71) Applicant: AquaSwift Inc., Picton (CA)

(72) Inventors: Russell Brookes, Picton (CA); Dylan Brookes, Picton (CA)

(73) Assignee: AquaSwift Inc., Picton (CA)

( * ) Notice: Subject to any disclaimer, the term of this patent is extended or adjusted under 35 U.S.C. 154(b) by 84 days.

(21) Appl. No.: 15/998,783

(22) Filed: Aug. 17, 2018

(65) Prior Publication Data

US 2019/0055835 A1    Feb. 21, 2019

(30) Foreign Application Priority Data

Aug. 18, 2017  (CA) .................................. 2976871

(51) Int. Cl.

| | |
|---|---|
| *E21B 47/047* | (2012.01) |
| *H04Q 9/02* | (2006.01) |
| *H04W 4/38* | (2018.01) |
| *H04W 60/02* | (2009.01) |
| *E21B 49/08* | (2006.01) |
| *E21B 47/06* | (2012.01) |
| *H04Q 9/00* | (2006.01) |
| *E21B 47/07* | (2012.01) |

(52) U.S. Cl.
CPC ............ *E21B 47/047* (2020.05); *E21B 47/06* (2013.01); *E21B 47/07* (2020.05); *E21B 49/08* (2013.01); *H04Q 9/00* (2013.01); *H04Q 9/02* (2013.01); *H04W 4/38* (2018.02); *H04W 60/02* (2013.01); *H04Q 2209/43* (2013.01); *H04Q 2209/60* (2013.01); *H04Q 2209/883* (2013.01); *H04Q 2209/886* (2013.01)

(58) Field of Classification Search
CPC ........ E21B 47/047; E21B 47/07; E21B 49/08; H04Q 9/00; H04Q 9/02; H04Q 2209/43; H04Q 2209/886; H04Q 2209/883; H04Q 2209/60; H04W 4/38; H04W 60/02
See application file for complete search history.

(56) References Cited

U.S. PATENT DOCUMENTS

| | | | |
|---|---|---|---|
| 4,142,411 A | 3/1979 | Deal | |
| 6,550,321 B1 | 4/2003 | Patey et al. | |
| 6,843,119 B2 | 1/2005 | Patey et al. | |
| 8,867,312 B1 * | 10/2014 | Straw | G01S 3/801 367/92 |
| 8,869,608 B2 | 10/2014 | Johnston | |
| 2009/0263127 A1 * | 10/2009 | Haran | H04Q 11/0067 398/38 |
| 2011/0307221 A1 * | 12/2011 | Higgins | G08B 5/36 702/187 |

(Continued)

FOREIGN PATENT DOCUMENTS

CA        2247644        3/1999

*Primary Examiner* — Alexander Satanovsky
(74) *Attorney, Agent, or Firm* — Stephen J. Scribner

(57) ABSTRACT

A system, method, and device for monitoring one or more sensors at a remote location. The system allows a user to register multiple sensors to the user's account. When the sensors are deployed at a remote location for measuring various properties of their surrounding environments, they collect data which is then transmitted to a server. The user may then monitor the data by connecting to the server via a client device, and receive alerts when the data satisfies certain conditions.

21 Claims, 15 Drawing Sheets

(56) References Cited

U.S. PATENT DOCUMENTS

2014/0009302 A1    1/2014   Singer et al.
2016/0043827 A1*   2/2016   Filson .................... H04K 3/226
                                                                                         370/252

* cited by examiner

METHOD AND SYSTEM FOR COLLECTING AND MANAGING REMOTE SENSOR DATA

FIELD

The invention generally relates to the sensing of a property (depth, temperature, quality, etc.), data collection, data storage, data distribution, data display, data retrieval, data analysis and action initiation (such as alerts and notifications), and the ability for users to purchase devices and/or services, and view and manage information.

BACKGROUND

There is a need to provide a low cost and reliable method for monitoring data from field sensors. For example, in environments where water sources are prone to fluctuating levels, such as water wells, there has not been an effective, reliable, and cost effective way for users of the source to know if the water level is getting low and if they are in jeopardy of running out, and mechanisms to manage the level. In addition to water levels, monitoring of other parameters such as those related to water quality or the environment in general are useful and often required; however, this requires additional types of sensors and more complex control and processing systems. The problem is exacerbated in remote locations where electrical power is not readily available and batteries, local power generation, etc. must be relied upon, resulting in the need for effective power management to ensure uninterrupted monitoring and to avoid loss of data. Currently available systems are unable to meet these demands.

SUMMARY

Described herein are systems and sensor devices, and methods for automatic monitoring of sensor measurements remotely, such as, for example, measurements relating to water depth of a well, and allow users to take recovery or preventative actions. More generally, the systems and sensor devices described herein provide monitoring of any data accumulated from sensors deployed in the field, and for the user to take actions in response to the data monitoring.

According to one aspect there is provided a method at a server, comprising: receiving, over a communications network, data from a plurality of sensors; associating the received data with a user identifier; receiving, over the communications network, a request from a client device, the request being associated to the user identifier; transmitting a response to the client device, the response comprising at least some of the received data.

In one embodiment, associating the received data with the user identifier comprises registering a sensor identifier associated to each of the plurality of sensors with the user identifier.

The method may further comprise: verifying that the received data satisfy a trigger condition; sending an alert to the client device indicating that the trigger condition is satisfied.

In one embodiment, the trigger condition is based on a value of a property measured by at least one of the plurality of sensors.

In one embodiment, the value is configurable via a configuration message from the client device.

In one embodiment, the alert comprises at least one of: a notification window displayed on the client device; a Short Message System (SMS) message sent to the client device; an email transmitted to an e-mail address associated to the user identifier; a telephone call to a phone number associated to the user identifier.

In one embodiment, the configuration message is generated based on at least one of: a web page displayed on the client device; an application running on the client device; an SMS message sent from the client device; an e-mail transmitted from the client device.

In one embodiment, the request is generated based on at least one of: a web page displayed on the client device; an application running on the client device; an SMS message sent from the client device; an e-mail transmitted from the client device.

The method may further comprise: receiving a command from the client device, the command indicating an action to be performed by the server relating to the plurality of sensors.

In one embodiment, the action comprises contacting a third party.

In one embodiment, the action comprises placing an order with a third party.

In one embodiment, the command comprises a parameter, the parameter identifying one of the plurality of sensors.

In various embodiments, the response may comprise data configured to populate a graphical user interface (GUI) of at least one of: a web page displayed on the client device; an application running on the client device.

In various embodiments, the method may further comprise authenticating the plurality of sensors.

According to another aspect there is provided a server comprising: a processor; a communications subsystem; wherein the processor and the communications subsystem cooperate to perform any of the methods described herein.

According to another aspect there is provided a method at a sensor device comprising: store data measured from an internal sensor of the sensor device; transmit the stored data and a device identifier to a remote server.

In one embodiment, the method further comprises storing data measured from an external sensor, the external sensor being configured to measure a property of an environment surrounding the external sensor, and the external sensor being configured to communicate with the sensor device using one of a wired network interface and a wireless network interface.

In one embodiment, the transmitting is performed periodically.

In one embodiment, the transmitting is performed upon a condition being met.

In one embodiment, the condition comprises a memory of the sensor being used at a threshold capacity.

In various embodiments, the method further comprises: running a watchdog timer; during normal operation, resetting the watchdog time prior to the expiry of the watchdog timer; upon expiry of the watchdog timer, rebooting the sensor device.

In various embodiments, the internal sensor and the external sensor comprise at least one of: a pressure sensor; a temperature sensor; a humidity sensor; a turbidity sensor; a pH sensor; an oxidation sensor; a sensor for identifying one or more gas.

In various embodiments, the sensor device comprises a second internal sensor.

In various embodiments, the internal sensor and the second internal sensor communicate via a processor of the sensor device.

In one embodiment, the internal sensor comprises a first pressure sensor and the external sensor comprises a second pressure sensor.

In one embodiment, a processor of the sensor device computes a water depth from a reading of the first pressure sensor and a reading of the second pressure sensor.

According to another aspect there is provided a sensor device comprising: a processor; a communications subsystem; an internal sensor, the internal sensor being configured to measure a property of an environment surrounding the sensor device; wherein the processor and the communications subsystem cooperate to perform any of the methods described herein.

In one embodiment, the sensor device further comprises a housing configured to house the processor, the communications subsystem and the internal sensor.

In one embodiment, the sensor device further comprises a solar panel that generates electrical power for operation of the sensor device.

In one embodiment, the solar panel is housed within the housing, the housing comprising a transparent portion above the solar panel.

According to another aspect there is provided a method for remote sensing of at least one property, comprising: disposing a sensor device in a location for sensing the at least one property, the sensor device including at least one sensor connected to a control module, and a power source; implementing a control module sleep/wake cycle; using the control module manage receiving at least one signal from the at least one sensor, the at least one signal corresponding to a reading of the at least one property; using the control module manage a communication interval with a server, wherein the control module communicates the at least one reading to the server; wherein managing is performed according an amount of power available from the power source, to conserve power; wherein remote sensing of the at least one property is maintained at a resolution determined by the sleep/wake cycle.

In one embodiment the method may comprise using the control module to receive the at least one signal from the at least one sensor during a wake portion of the sleep/wake cycle.

In one embodiment managing comprises turning on communications circuitry of the control module only during a communication interval.

In one embodiment managing comprises maintaining the communication interval according to the wake portion of the sleep/wake cycle when an amount of power available from the power source is at or above a threshold amount; increasing the communication interval by a selected number of sleep/wakes cycles according to an amount of power available from the power source below a threshold amount; and maintaining the control module receiving the at least one signal from the at least one sensor during the wake portion of the sleep/wake cycle, such that two or more readings are communicated to the server during an increased communication interval.

In one embodiment managing comprises buffering sensor readings during an increased communication interval.

According to another aspect there is provided a method for remote sensing of at least one property, comprising: disposing a sensor device in a location for sensing the at least one property, the sensor device including at least one sensor connected to a control module, and a power source; implementing a control module sleep/wake cycle; using the control module to receive, during a wake portion of the sleep/wake cycle, at least one signal from the at least one sensor, the at least one signal corresponding to a reading of the at least one property; using the control module to set a communication interval with a server, wherein the control module communicates the at least one reading to the server; maintaining the communication interval according to the wake portion of the sleep/wake cycle when an amount of power available from the power source is at or above a threshold amount; increasing the communication interval by a selected number of sleep/wakes cycles according to an amount of power available from the power source below a threshold amount; maintaining the control module receiving the at least one signal from the at least one sensor during the wake portion of the sleep/wake cycle, such that two or more readings are communicated to the server during an increased communication interval; wherein remote sensing of the at least one property is maintained at a resolution determined by the sleep/wake cycle.

In one embodiment the method comprises turning on communications circuitry only during a communication interval.

In one embodiment the method comprises buffering sensor readings during an increased communication interval.

One embodiment the method comprises receiving, over a communications network, data from the control module, the data including the at least one reading of the at least one property by the at least one sensor; associating the received data with a user identifier; wherein associating the received data with the user identifier comprises registering a sensor identifier associated with the at least one sensor with the user identifier.

In one embodiment the method comprises receiving, over the communications network, a request from a client device, the request being associated with the user identifier; transmitting a response to the client device, the response comprising at least some of the received data.

In one embodiment the method comprises determining whether the received data satisfy a trigger condition; and transmitting an alert to the client device, the alert indicating that the trigger condition is satisfied.

In one embodiment the trigger condition is based on a value of the at least one property measured by the at least one sensor. In one embodiment the value is configurable via a configuration message from the client device.

In one embodiment the method comprises receiving, over the communications network, a command from a client device, the command being associated with the user identifier; wherein the command indicates an action to be performed by the server or the control module relating to the at least one sensor.

In one embodiment the method comprises disposing a first pressure sensor above a water source and disposing a second pressure sensor at a bottom of a water source; and determining a water depth from a reading of the first pressure sensor and a reading of the second pressure sensor. In one embodiment of the method the water source is a well.

According to another aspect there is provided a sensor device, comprising: a control module including a communications subsystem; at least one sensor connected to the control module and configured to measure at least one property of an environment surrounding the at least one sensor; and a power source; wherein the control module implements a sleep/wake cycle and manages receiving at least one signal from the at least one sensor, the at least one signal corresponding to a reading of the at least one property; wherein the control module manages a communication interval with a server, wherein the control module communicates the at least one reading to the server; wherein the control module manages the communication interval according an amount of power available from the power source, to conserve power; wherein the sensor device maintains remote sensing of the at least one property at a resolution determined by the sleep/wake cycle.

In one embodiment the control module receives the at least one signal from the at least one sensor during a wake portion of the sleep/wake cycle.

In one embodiment the control module turns on communications circuitry of the control module only during a communication interval.

In one embodiment the control module maintains the communication interval according to the wake portion of the sleep/wake cycle when an amount of power available from the power source is at or above a threshold amount; and increases the communication interval by a selected number of sleep/wakes cycles according to an amount of power available from the power source below a threshold amount; and maintains receiving the at least one signal from the at least one sensor during the wake portion of the sleep/wake cycle, such that two or more readings are communicated to the server during an increased communication interval.

In one embodiment sensor readings are buffered during an increased communication interval.

According to another aspect there is provided a sensor device, comprising: a control module including a communications subsystem; at least one sensor connected to the control module and configured to measure at least one property of an environment surrounding the at least one sensor; and a power source; wherein the control module operates according to a sleep/wake cycle; wherein the control module receives, during a wake portion of the sleep/wake cycle, at least one signal from the at least one sensor, the at least one signal corresponding to a reading of the at least one property; wherein control module communicates the at least one reading to a server during a communication interval; wherein control module maintains the communication interval according to the wake portion of the sleep/wake cycle when an amount of power available from the power source is at or above a threshold amount; wherein control module increases the communication interval by a selected number of sleep/wakes cycles according to the amount of power available from the power source below a threshold amount; wherein control module maintains receiving the at least one signal from the at least one sensor during the wake portion of the sleep/wake cycle, such that two or more readings are communicated to the server during an increased communication interval.

In one embodiment the power source comprises a battery.

One embodiment further comprises a solar panel that generates electrical power to charge the battery and/or to operate the sensor device.

In one embodiment the communications subsystem comprises at least one of a cellular communications module and a WiFi module.

In one embodiment the at least one sensor comprises at least one of:
 a pressure sensor;
 a temperature sensor;
 a humidity sensor;
 a turbidity sensor;
 a pH sensor;
 an oxygen sensor;
 a sensor for at least one gas.

In one embodiment the at least one sensor comprises first and second pressure sensors.

In one embodiment the first pressure sensor is configured to be disposed above a water source and the second pressure sensor is configured to be disposed at a bottom of a water source; and the property is a water depth obtained from a reading of the first pressure sensor and a reading of the second pressure sensor.

In one embodiment the water source is a well.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION

Figure 1:
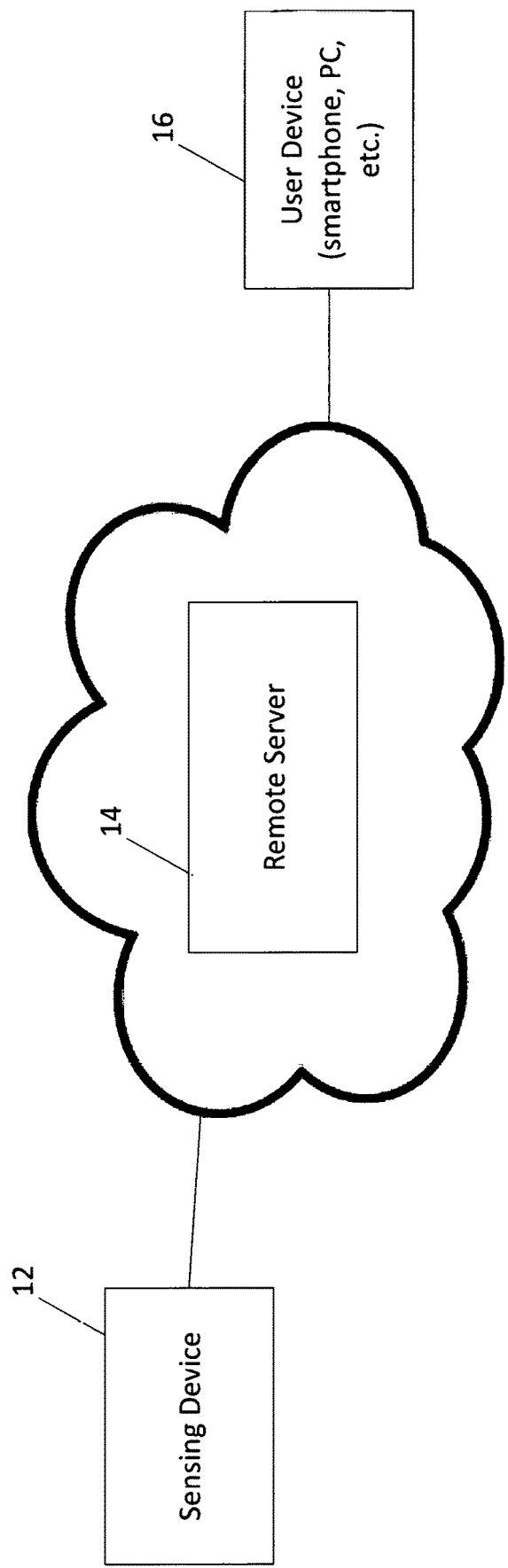
FIG. 1 is a block diagram of a system according to one embodiment.

For greater clarity, embodiments are described herein in terms of a water monitoring system that senses water depth and/or one or more property of the water and/or the surrounding environment. However, at least some of the devices, techniques, and methods described herein may be applied to other types of monitoring systems, and this disclosure is not so limited.

Embodiments are described for applications such as well water monitoring, but may also be used for tanks, reservoirs, and natural bodies of water such as rivers, lakes, ponds, and springs. Thus, as used herein, the term "well" shall be understood to include any such water source. Embodiments may provide one or more functions including collecting sensed data corresponding to the one or more properties, and storing, distributing, and providing notifications based on the sensed data, and allowing action upon the data or analysis of the data. Embodiments may incorporate features for internet, wired, and/or wireless communications, cloud computing services and platforms, low cost sensors and microprocessors, and use online payment systems, so that sensor data is available to users anytime, and anywhere. For example, in one embodiment a system is provided that monitors water depth (and optionally one or more other properties) in a well, and an alert is sent to a user if the water level in the well is low. Once alerted the user can respond via, e.g., text message to initiate an order for water to be delivered by a local delivery agent. The system can process the payment, and confirm that the well has been re-filled.

This can all be done remotely from the well using a smartphone, tablet, or computer. The online system also allows for the purchasing of the sensor device and online service.

As used herein, the term "sensor device" refers to electronic circuitry, optionally including a power supply and/or power generation, together with at least one sensor that senses a property of its surroundings.

In an exemplary scenario in accordance with embodiments described herein, a user having identified the need to monitor the level of the water and/or one or more other property in a well, may contact an authorized vendor and purchase a service and hardware components (i.e., a "sensor device"). The sensor device will then be provided to the user with installation instructions. Once the sensor device is installed, the user may then access a website and complete tasks such as registering the sensor device using, e.g., a sensor code, optionally set a nickname for the hardware/device, and set parameters such as water notification levels. The user may then review notification settings and ensure that proper options are selected, and provide phone numbers, email addresses, or other identifying information needed for notifications.

The water level, and/or other sensor data relating to a property or properties being sensed may then be viewed by visiting a website, or by accessing an application on a mobile device such as a cellular phone or tablet. The information may be viewed through a graphical user interface (GUI), or can be downloaded to a local device. According to at least one embodiment, data corresponding to one or more property may be obtained by texting a command to a phone number provided by the service provider. For example, a command such as "water level" may be configured to provide information on the water level. A user may then simply send a Short Message Service (SMS) consisting of "water level" at the provided phone number, and the user may then receive a SMS in response providing the requested information.

If water level and/or another property reach a point for which a notification is set, the monitoring system will provide a notification such as a telephone call, an SMS, an email, etc. In the case of an SMS, a user may reply to the notification with a command such as "order", and receive a list of water suppliers in the relevant area in response. When water is delivered, the system may send a notification confirming the new water level.

A monitoring system as described herein consists of a number of "system blocks". Each of these blocks in turns consists of sub-blocks. Each of these blocks and sub-blocks will be described in greater detail below.

The design is general, and as such can exist in many variants of physical form. For illustrative purposes an example will be given for each design element. Embodiments are not limited to this specific example.

Reference is made to FIG. 1, in which a high level monitoring system is illustrated. The system includes a sensor device 12 and a remote server 14. The sensor device 12 includes hardware that senses and collects data, and communicates data to the remote server 14. The sensor device may also receive commands from a user or from the remote server, and take appropriate actions. The remote server receives data from the sensor device and stores it for subsequent use or viewing by a user, or as input to various alerting or analysis algorithms. The remote server may receive data periodically or upon a condition being met. The condition may be based on memory requirements at the sensor device. The server may also host a website for presenting the sensor data to a user, provide data to applications on mobile devices, and receive and process SMS requests and commands. In at least some embodiments, the website may allow a user to purchase additional products and services, interact with the sensor data, manage user accounts, and generate alerts or other actions as described in greater detail below. The remote server may consist of a single server or a plurality of servers acting in concert to achieve the above functionality.

Figure 2:
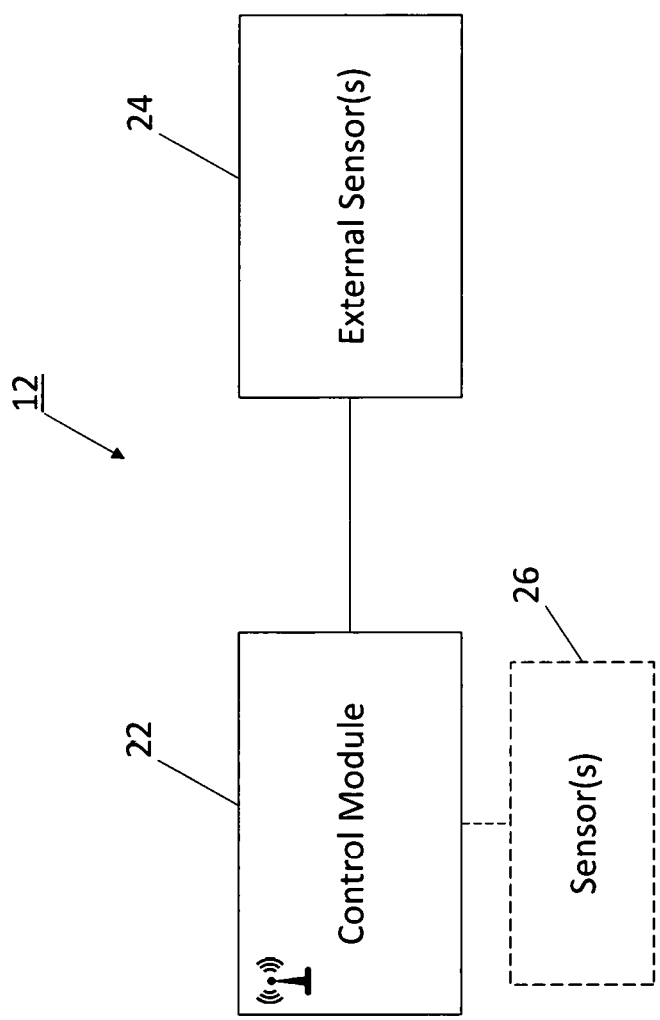
FIG. 2 is a block diagram of a sensor device according one embodiment.

Reference is made to FIG. 2, in which an exemplary sensor device 12 is illustrated. The sensor device includes a control module 22 that provides power for the device, a processor and firmware/software to operate and communicate with one or more external sensor modules 24, communicate (typically wirelessly) with the remote server 14, and take actions as directed. The control module may optionally include external and/or internal sensors 26.

Figure 4:
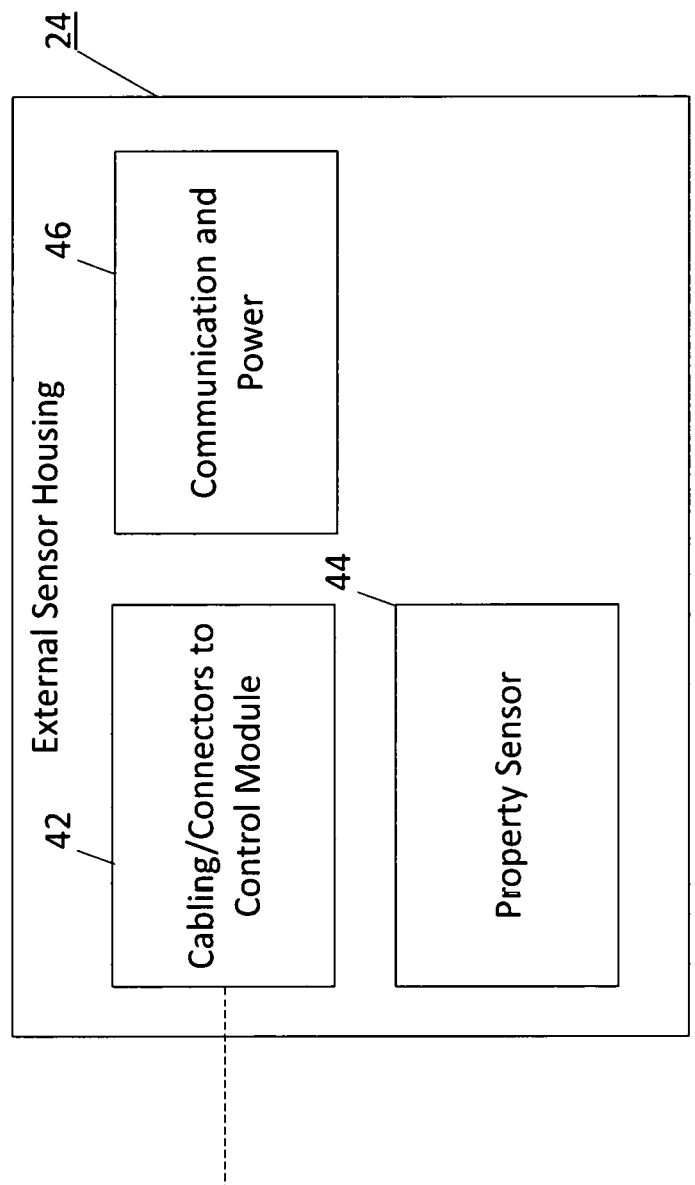
FIG. 4 is a block diagram of an external sensor according to one embodiment.
Figure 6:
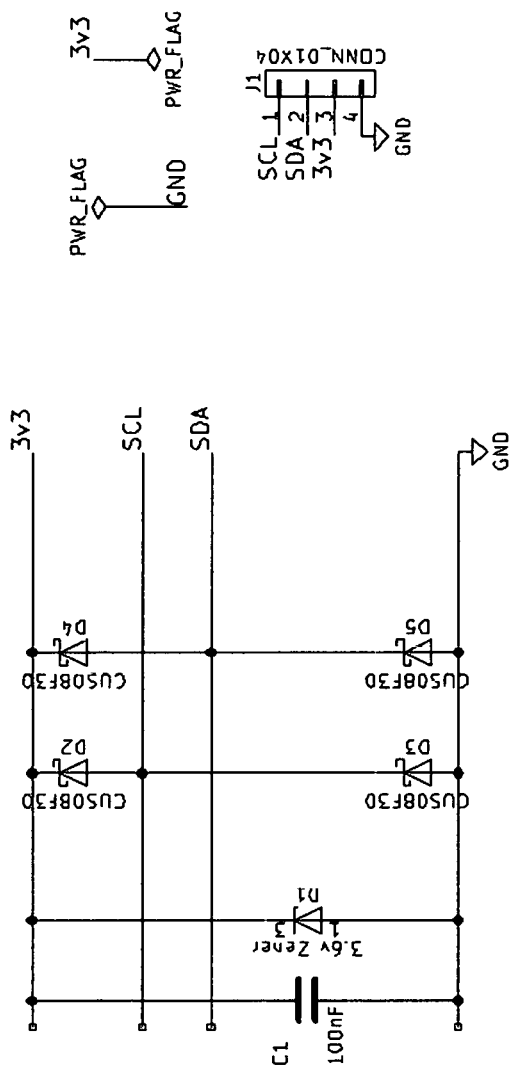
FIG. 6 is a schematic diagram of an external sensor according to one embodiment.
Figure 6:
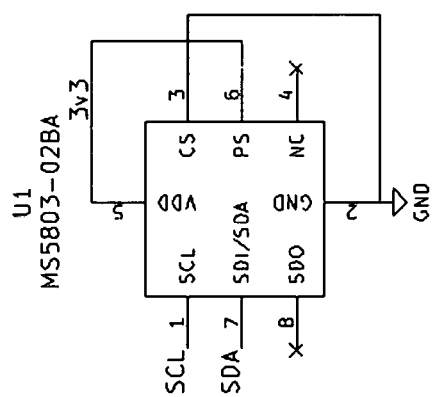

An embodiment of an external sensor 24 is shown in FIG. 4. The external sensor may be in a housing that provides physical protection, and allows it to sense the property or properties it is designed to sense. The external sensor may be connected via wires 42 to the control module. In at least some embodiments, the wires/cabling connecting the external sensor to the control module also provides power from the control module to the external sensor. However, in an alternative embodiment, the external sensor may have its own power source, such as a solar panel, a battery, or a connection to a power outlet. In another embodiment, the external sensor may communicate with the control module wirelessly, such as through a Wireless Local Area Network (WLAN) like WiFi™, a cellular network like LTE, or Bluetooth™. The external sensor includes at least one property sensor 44 that senses a specific property (such as, but not limited to, pressure, temperature, depth, turbidity, etc.) and circuitry 46 for communicating relevant signals to the control module. An example of suitable circuitry for implementing an external sensor, in this case a pressure sensor, is shown in FIG. 6. In some embodiments an external sensor module also performs function such as quantifying the property being sensed and communicates the quantified signals to the control module. The control module may provide an interface for a plurality of external sensors to be connected thereto. In such a modular design the control module may be configured to recognize the type of sensor module connected (e.g., pressure, temperature, depth, turbidity, etc.) and process the signal/data accordingly.

Figure 3:
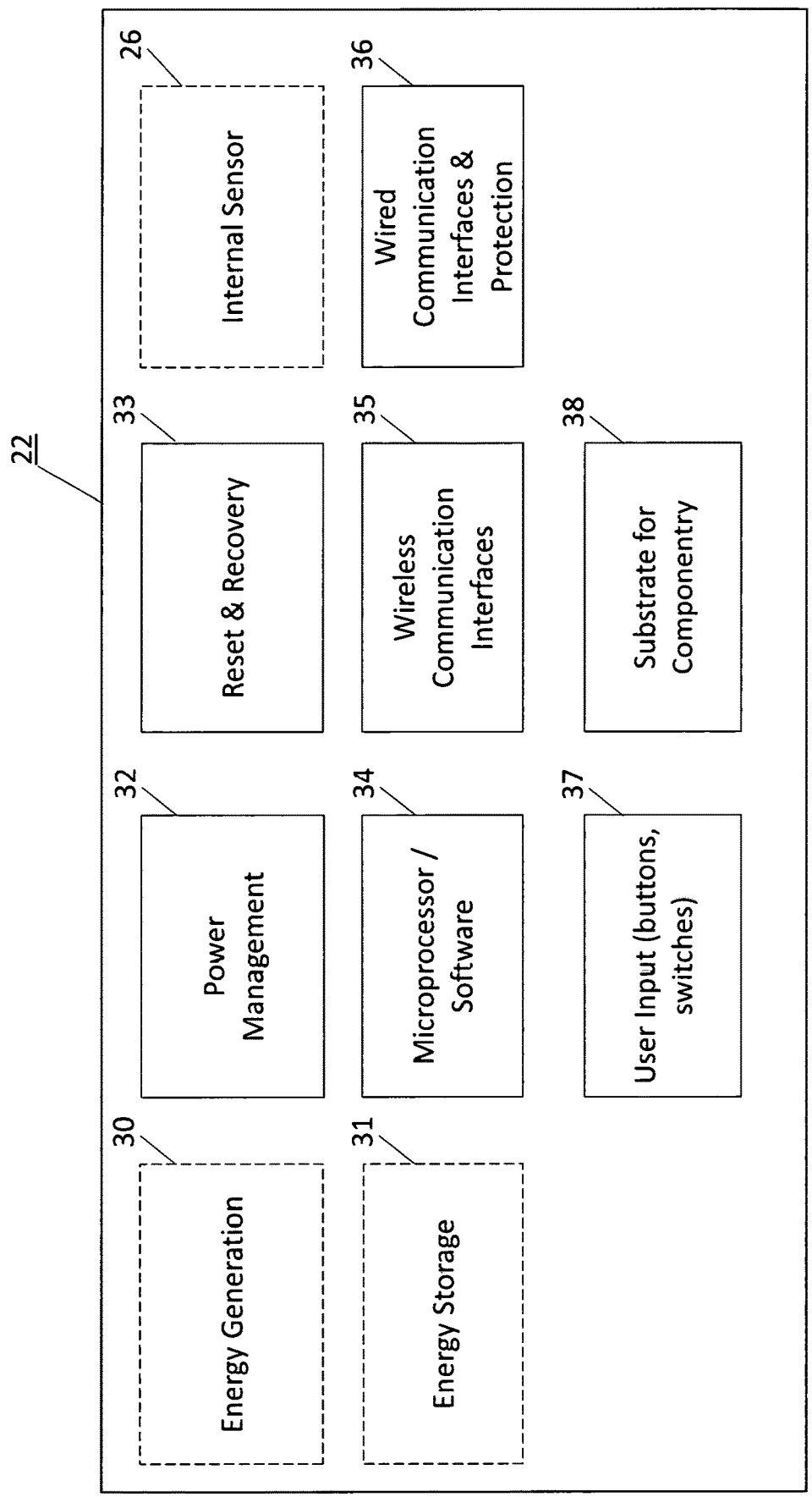
FIG. 3 is a block diagram of a control module according to one embodiment.

Reference is made to FIG. 3, which illustrates an exemplary control module of the sensor device.

In at least some embodiments, the control module 22 may optionally include an energy generation sub-block 30, such as a solar panel. Additionally or alternatively, the control module may optionally include an energy storage sub-block 31 comprising batteries, super-capacitors, or other energy storage device(s), and/or a connection for connecting to an external power source. For example, the energy generation module may comprise a 6 volt, 100 mA solar panel connected via a diode to the energy storage device, so as to prevent the energy storage device from discharging through the solar panel when it isn't generating energy. The output of the energy generation device 30 may be directed through this diode to the input of power management circuitry 32. The power management circuitry manages and distributes power to other components of the control module. For example, the power management circuitry may be responsible for receiving energy from the energy generation sub-block 30, delivering it as required to other components, and protecting components from too much, too little, or reverse energy.

Figure 5A:
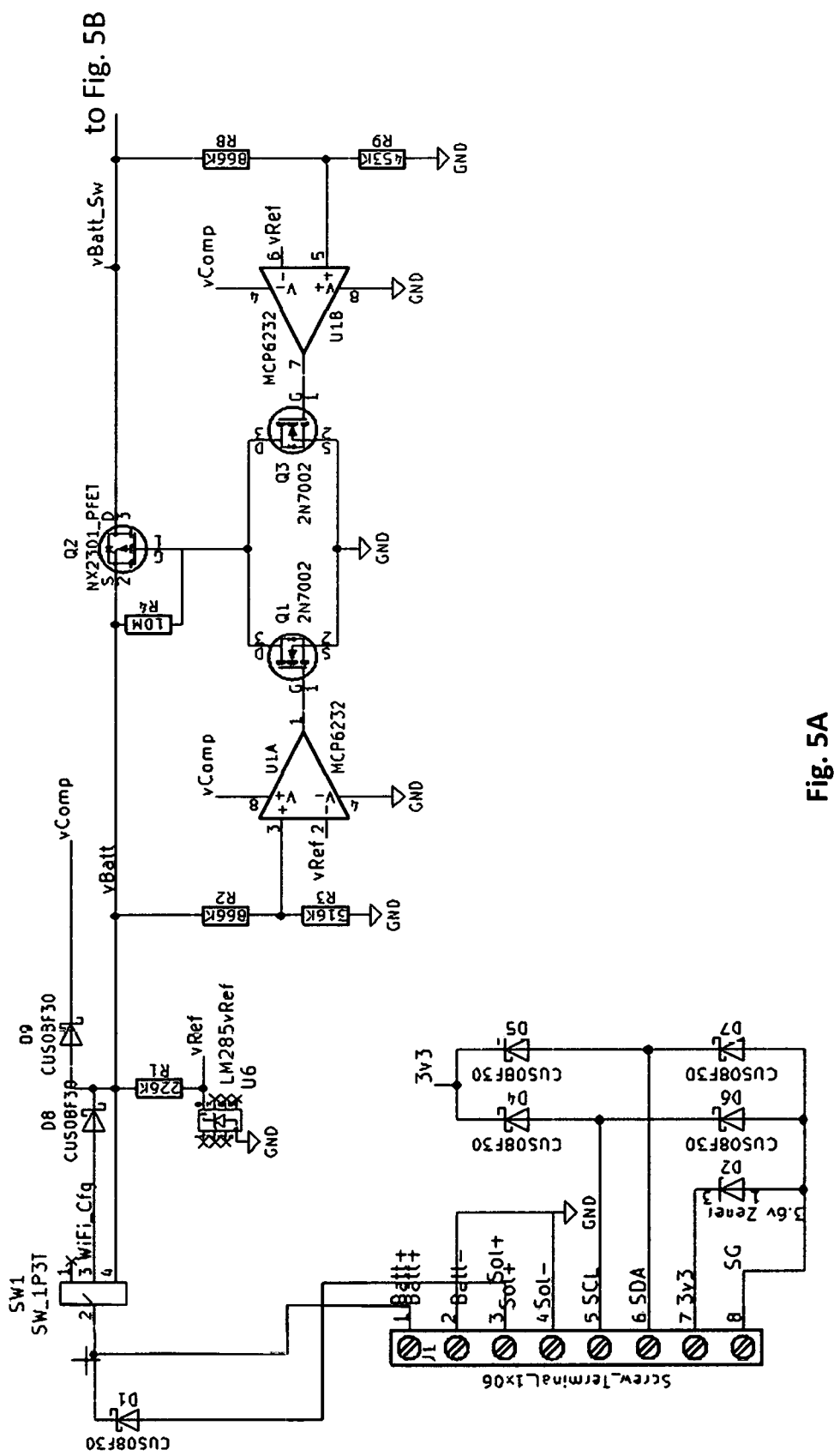
FIGS. 5A-5F are schematic diagrams of a control module circuitry according to various embodiments.
Figure 5B:
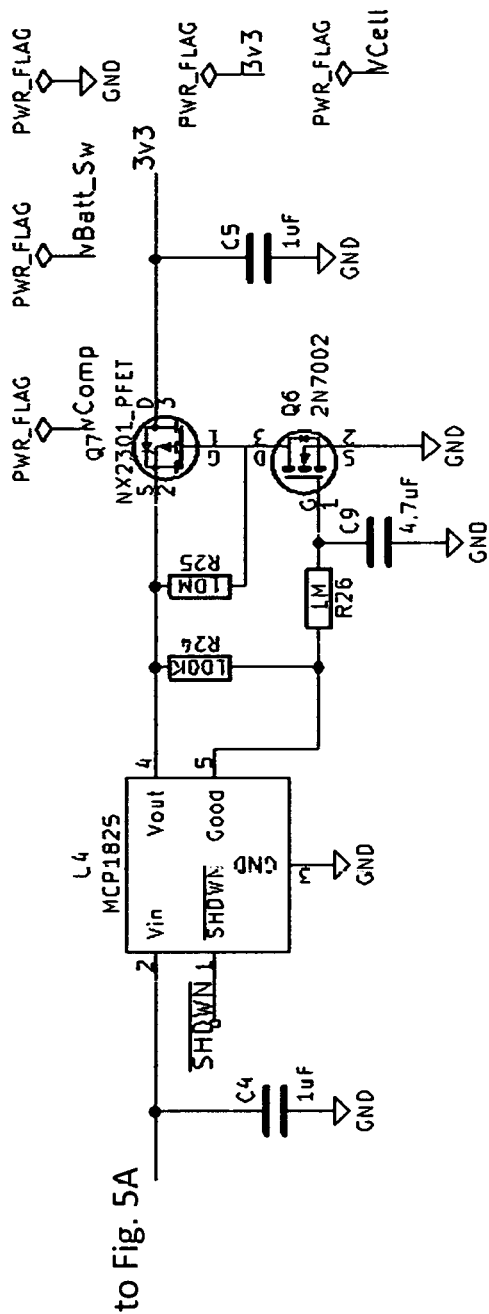

Examples of electronic circuitry suitable for implementing features of the control module is shown in FIGS. 5A-5F. Those of ordinary skill in the art will readily appreciate that other implementations are possible. As shown in the embodiment of FIGS. 5A and 5B, the power management circuitry 32 may be implemented as a power switch (SW1), low current voltage reference (U6), comparator circuitry (U1A and U1B and associated components), an electronic switch (Q2 PFET), and a voltage regulator (U4 and associated components).

The voltage reference and comparators provide the ability to turn off the device if the voltage drops too low to prevent over-draining the energy storage device 31, and the ability to keep the circuit turned off until the energy generation device has refilled the energy storage device to the point where it can safely resume powering the sensor device. In the example circuitry of FIG. 5A the device shuts off if the energy storage device voltage drops below 3.6 volts (nominal) and allows the circuit to turn back on once the voltage rises above 4.6 volts (nominal).

In addition, as shown in FIG. 5B, to aid in power recovery situations, the resistors R24, R25, R26, capacitor C9, and switches Q6, Q7, are used in conjunction with the regulator U4 to ensure that a stable good voltage is being provided by U4 prior to turning on power (via Q7) to the rest of the circuitry.

In the example of FIGS. 5A-5B, the PFET serves a double role of electronic switch for over and under voltage conditions, and it also serves to protect the "downstream" circuitry (voltage regulator, microprocessor, sensors, etc.) from reverse voltage protection, in a way that minimizes power waste such as would occur if a simple diode was used as reverse voltage protection.

In the example of FIGS. 5A-5B, for the comparator circuitry that must remain operational while the rest of the device is in a powered down state, reverse polarity protection is provided via a diode (D9). However due to the use of low quiescent current comparators the power waste across this diode is negligible.

As noted above, according to at least some embodiments, the control module 22 includes an energy storage sub-block 31. In some embodiments, energy from the energy generating sub-block 30 is stored in the energy storage sub-block 31 for use by the rest of the sensor device.

In one embodiment, the battery may be implemented as four 1.2 volt nickel metal hydride rechargeable batteries connected in series. In the embodiment illustrated in FIG. 5A, the solar panel is connected across the batteries with the use of a diode (D1).

In at least some embodiments, the control module 22 further includes a device reset and recover circuitry. The device reset and recover circuitry allows the sensor device to be restarted in case of malfunction.

Figure 5C:
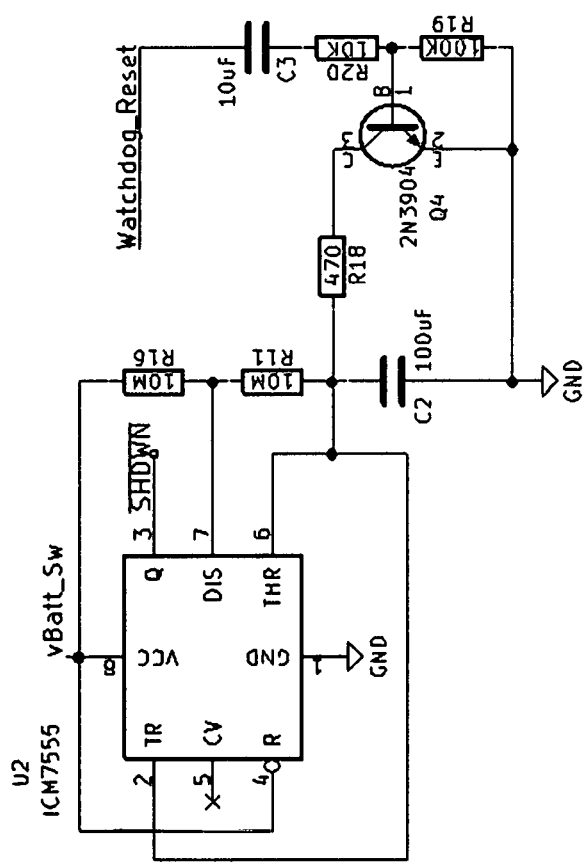

In at least one embodiment this is implemented via a watch dog timer, such as shown in the example of FIG. 5C. During normal operation the watchdog timer will reset periodically. If the watch dog timer isn't reset by the prescribed time, then it will "time out" and reset the circuitry. The "555 timer" (U2 and associated circuitry) in conjunction with the Shutdown feature of the voltage regulator is used to implement the watch dog timer and reset functionality. Under normal operation the microprocessor will reset the watchdog timer. If it fails to do so within the prescribed time frame it will turn off the voltage regulator via the SHDWN connection, and then subsequently turn it back on again. This in effect turns off the rest of the circuitry and then turns it back on, allowing it to restart and recover from unexpected non-functional states.

Further strategies for power management, including minimizing power consumption, and buffering sensor readings, are described in Examples 1, 2, and 3, below.

As noted above, the control module 22 may optionally include internal sensors 26, such as, for example, temperature sensors, pressure sensors, and the like. Internal sensors are distinguished from external sensors in that they are internal to the control module and do not need to be connected to the control module via external connections, as in the case of the external sensors. An example of an internal pressure sensor implementation is shown in FIG. 5F.

The sensed property of internal and external sensors can be anything for which a sensor exists—pressure, temperature, humidity, turbidity, pH, oxidation, types of gasses, and the like. The sensed properties in at least one exemplary embodiment are pressure and temperature.

When required, the sensors communicate with one another over an appropriate interface, such as current loop, inter-integrated circuit (I2C), serial peripheral interface (SPI), serial data, RS485, differential drivers, and the like. In at least one embodiment, multiple sensors designed to measure a water level communicate via I2C. For example, one sensor is placed at the bottom of the water volume that will have its depth monitored, and another sensor placed in the air at approximately the top of the water volume (e.g., an internal sensor 26 disposed in the control module 22 of FIG. 3, optionally implemented as shown in FIG. 5F).

In such an embodiment the bottom sensor measures pressure and temperature of the water. The top sensor measures pressure and temperature of the air. The difference in pressure between the bottom sensor and the top sensor is due to the weight of the water causing a higher pressure at the bottom sensor. Hence the height of the water above the bottom sensor can be derived from this pressure difference using the relationship that the depth of 1 foot of water is approximately 31 mbars of pressure difference (between surface of water and 1 foot below the water). It will be appreciated that for liquids of different density the pressure differential by depth is different and can be readily determined.

In one exemplary embodiment, both pressure sensors are used, since it is normal for atmospheric pressure to vary as weather changes, and with different elevation. As a low pressure area moves into a geographic area the air pressure will drop, and this will cause less pressure on the top of the water volume, and hence less pressure at any particular point in the water volume. If this were not taken into account, and the pressure reading at the bottom of the water volume only was used in conjunction with a standard sea level pressure (i.e., 1013 mbars), then changes in weather would cause false readings of changes in water depth. Also, if a unit was installed at a higher elevation than sea level, then it would result in an inaccurate calculation of water depth.

For example, sensors having an accuracy of +/−0.12 mbar, which equates to a depth accuracy of +/−0.05 inches, may be used. As two sensors are needed to calculate the differential pressure, the resulting accuracy is +/−0.1 inches.

The top sensor may be mounted with the control module circuit board and needs no further protection from the weather elements than that of the circuit board. The bottom sensor, however is submerged in the water (or other liquid) at some distance from the control module and hence has other design considerations as discussed below.

As shown in the embodiment of FIG. 3, a microprocessor 34 is used to execute a program that controls the control module and sensor operation.

Figure 5D:
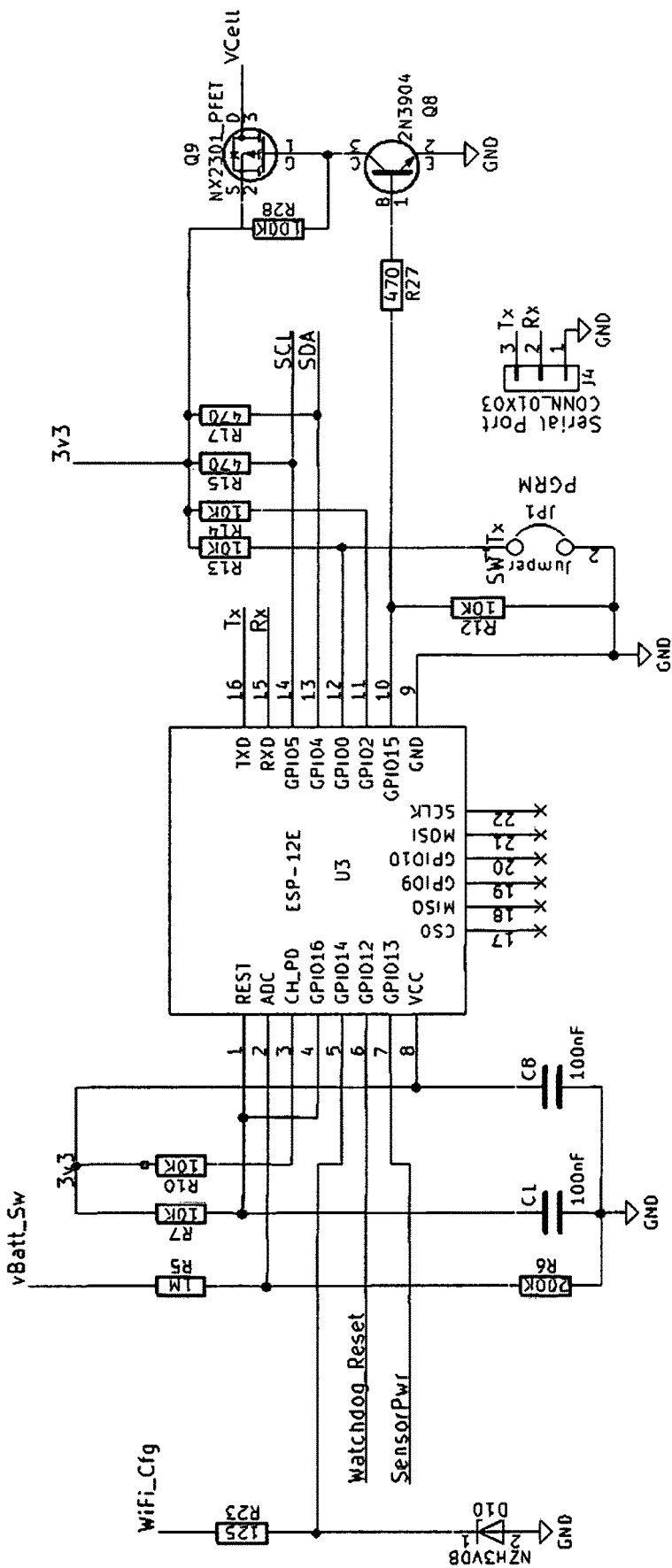
Figure 5F:
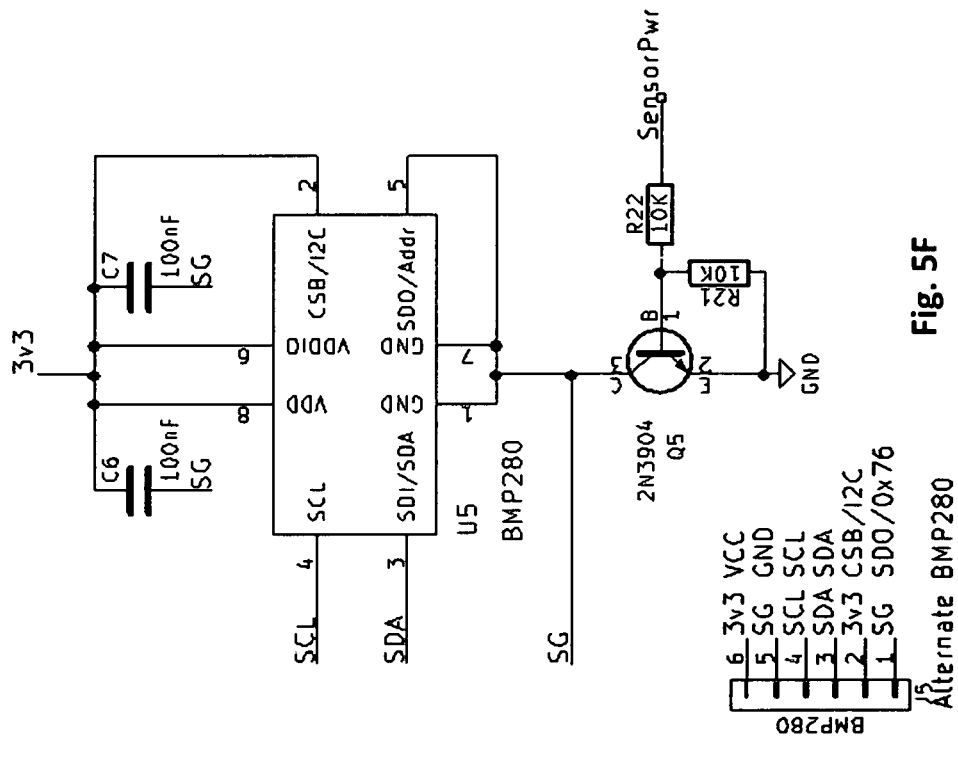

In the embodiment illustrated in FIG. 5D the microprocessor (U3) used is an ESP8266 (Espressif Systems, Shanghai, China), however any suitable microprocessor will do. This microprocessor has the benefits of including a WiFi interface, having low overall power consumption, sufficient GPIO (general purpose input/output pins), ability to measure battery voltage, and the ability to go into a low power sleep mode when the unit is not active.

According to at least one embodiment, the microprocessor executes code to perform at least some of the following operations:

- Configuration and communication via a WiFi network. Configuration may be performed via a smartphone wirelessly communicating with the control module or other techniques known in the art.
- Configuration and communication via a cellular communications network (e.g., Code Division Multiple Access (CDMA), Global System for Mobile communications (GSM), Long Term Evolution (LTE), High Speed Packet Access (HSPA), etc.).
- Reads sensors and communicates the data to the remote server.
- Combines data from multiple sensors to compute useful information (for example, the water level is computed based on the pressure difference between a top sensor and a bottom sensor).
- Sends location and diagnostic information (e.g., battery voltage, firmware version, model, location, wireless connection quality and signal strength, etc.) to the server.
- Power management, including, e.g., putting the sensor device to sleep between sensor readings to manage power consumption; and adjusting sleep time if needed to provide extra power savings if power is getting critically low (see Example 1).
- Manage remote software upgrades/downgrades so that the software running on the microprocessor can be changed as needed, remotely (see Example 5).

The control module may also communicate the data collected from both internal and external sensors to the remote server. This communication may be wireless or wired. In wireless embodiments, the communication may use standard wireless communication capabilities such as WiFi, cellular data, long range data communications (LoRa), and the like. In at least one embodiment, multiple communication interfaces are used where possible to maximize the probability of communication success in the event that one communication mechanism is not functioning.

Figure 5E:
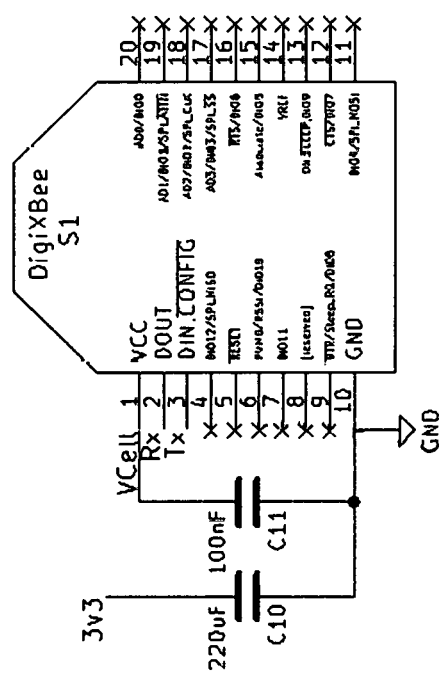

According to at least one embodiment, the control module uses both WiFi and/or cellular data communication. The WiFi communication may be part of a microprocessor such as an ESP8266 microprocessor (U3) as described above, and the cellular data communication may be performed by a cellular data module controlled by, or working in conjunction with, the microprocessor. For example, cellular communications may be implemented as shown in the embodiment of FIG. 5E.

The control module provides the ability for a user to interact with the module for purposes such as turning the unit on or off, or configuring some parameters of the unit.

In the exemplary embodiment illustrated in FIG. 5A, switch SW1 in the control module is provided for this purpose. It has three positions. In position 1 the unit is off—no power flows from the battery to the circuitry. However the solar panel, if receiving light, will still charge the battery. In at least one embodiment, there is an additional switch that disconnects the battery from the solar panel.

When SW1 is in position 2, the unit is on, and in a WiFi Config mode. In this mode a user can set or change the WiFi connection credentials that the unit uses to communicate with the users WiFi access point.

When SW1 is in position 3, the normal "on" position, the unit operates as intended—gathering sensor data and system diagnostics. If the unit has no WiFi credentials when switched on, it will also go into a mode for a period of time that will allow the user to provide WiFi credentials. If they are not provided in that timeframe it will continue normal operation using whatever other communication interfaces it has (for example cellular data interface, wired interface).

In some embodiments, cellular data interface configuration may be contained within a SIM card inserted into the device.

Additional buttons or switches or a keypad may also be included for other user input or calibration.

According to at least one embodiment, the control module comprises a housing with a transparent lid that allows sunlight to energize an internal solar panel (i.e., a photovoltaic (PV) cell). In at least one embodiment the housing is rated IP67 or IP68 for protection against dust, rain, and snow. According to at least one embodiment, there is a suitable opening, diaphragm, etc. in the housing to allow the interior pressure to be the same as the exterior air pressure.

In embodiments where the connection between the control module and the external sensor is a physical cable, the cabling extending from the external sensor to the control module may be any standard cabling suitable for the environment and electrical characteristics.

In at least one embodiment, the cabling is plastic/rubber insulated to protect against water and electrical short circuit. It may consist of twisted pairs each of wire of suitable gauge, such as at least 24 AWG. One pair of wires may be used to provide power, and another pair of wires may be used for data transfer.

The external sensor communicates with the control module. In cases of wireless communication, battery power or suitable energy generation are used for the sensor. For example, water flow sensors can use the motion of the water to generate the energy used to operate and communicate with the control module, and pressure sensors may use a piezoelectric effect. Other types of sensors may generate electricity using temperature differences, or the like.

In an exemplary embodiment, the external sensor can be many feet away and the communication and power interfaces are designed to withstand transient energy spikes that may be induced from the environment or circuitry.

Other wires in the cable may be for data communication. A pair of diodes with a suitably low forward voltage may be used to connect each communication line to both power and ground lines. This ensures that the voltage cannot go below the ground potential minus the diode forward voltage drop, and cannot go higher than the power voltage plus the diode forward voltage drop. This protection may be provided at both ends of the cable—i.e., in the external sensor module and in the control module. Referring to the exemplary embodiments shown in the figures, these are diodes D2, D3, D4, D5 in the external sensor (FIG. 6), and diodes D4, D5, D6, D7 in the control module (FIG. 5A).

In an exemplary embodiment the communication is done via the I2C protocol. This provides the capability to add other sensors to the control module or the external sensor, or add new external sensors, using existing cabling and the I2C addressing scheme.

In an exemplary embodiment, the remote sensor is implemented on a printed circuit board, with protection diodes as described previously, and the active sensor. In one embodiment the circuit board is enclosed in an airtight but flexible bladder that is sealed at approximately normal surface atmospheric pressure. The bladder may then be further enclosed in a plastic housing that allows water to penetrate to its interior. The power/communication cable runs from the circuit board inside the sealed bladder and through to the outside of the plastic housing. The passage through the bladder is done using sealants that do not allow the water to penetrate into the inside of the bladder.

Figure 7:
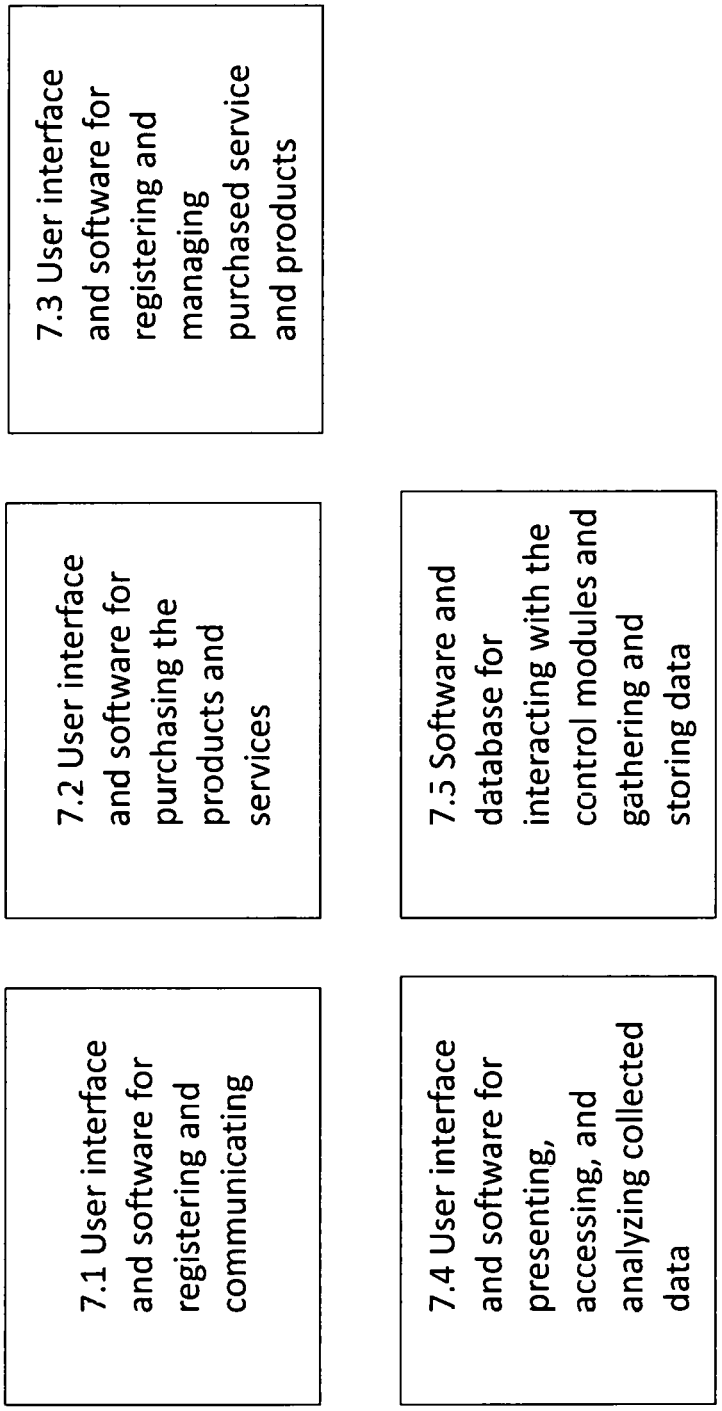
FIG. 7 is a block diagram of a website interface according to one embodiment.

Reference is made to FIG. 7, which is a block diagram of an embodiment of software running on the remote server.

In some embodiments, the remote server may allow a user to register an account and sign in when the user visits the website (or access an application on a mobile device) (see 7.1). Registration may involve verifying the authenticity of the user's email. This may be done by sending the email a verification link that when clicked, which brings the user to the website where the link is checked for its authenticity using hashes. If the hash matches the one that the server has on file, the user will then have successfully authenticated their email with the website and will be redirected to pages specific to them. Other techniques may of course be implemented.

Figure 8:
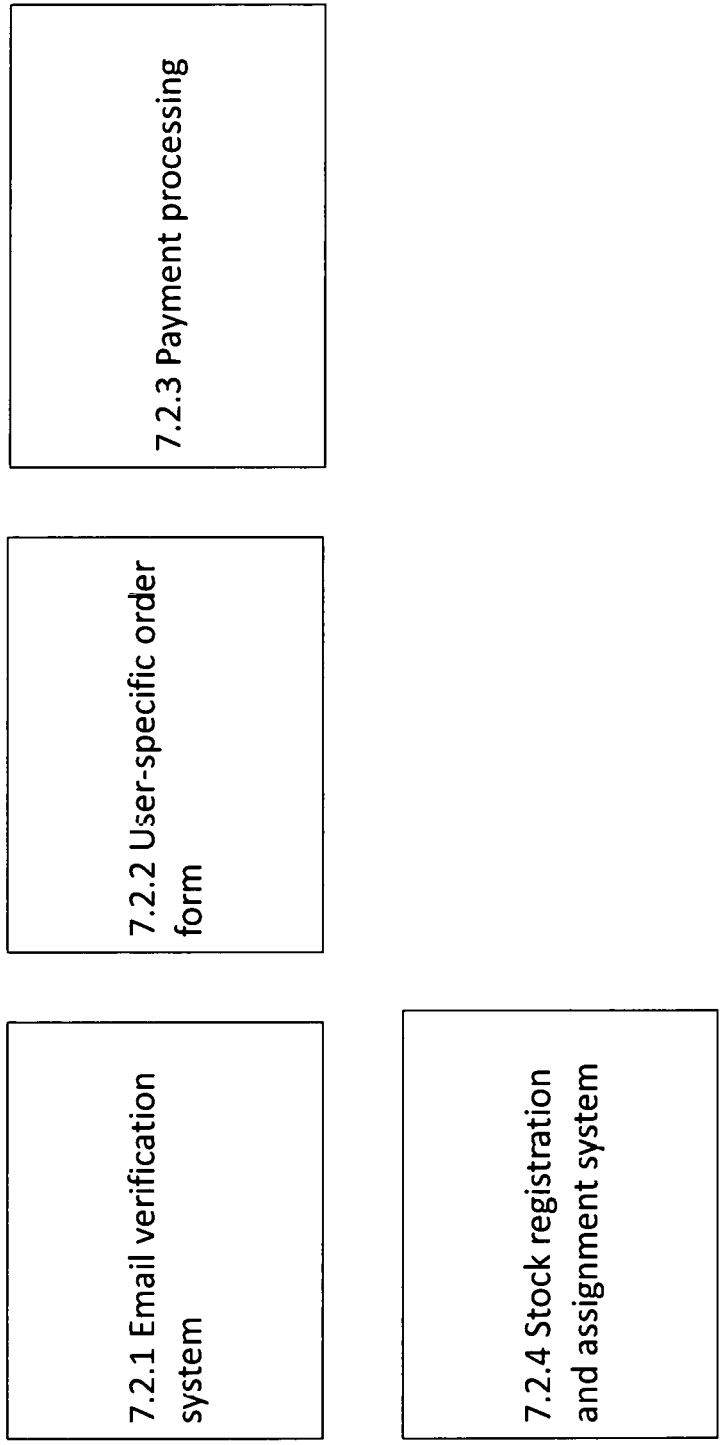
FIG. 8 is a block diagram of a website interface according to another embodiment.

The remote server may also provide an interface 7.2 allowing the user to make further purchases, such as additional external sensors, control modules, data storage, and the like. FIG. 8 shows features of a user interface according to one embodiment.

Figure 9:
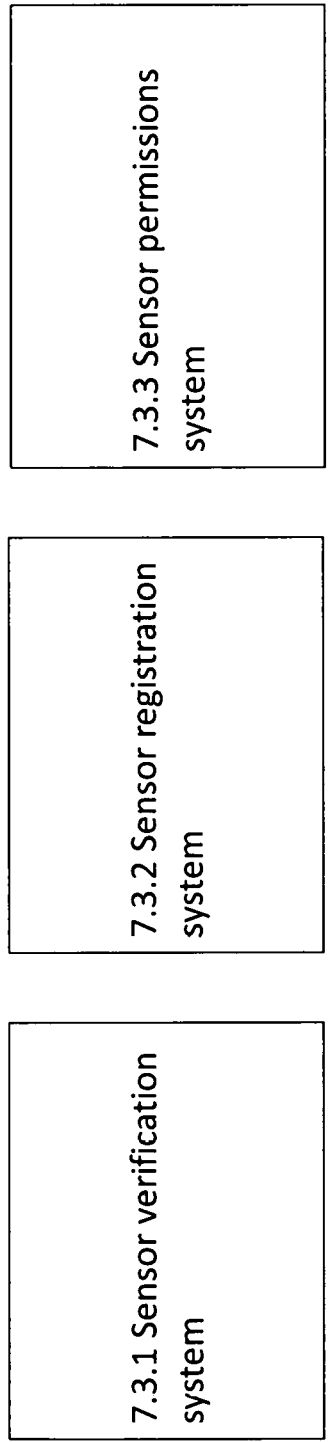
FIG. 9 is a block diagram of a website interface according to another embodiment.

According to at least one embodiment, when an order is placed, the order information is passed to a database on the remote server which stores sensor information. Each purchased sensor is then added to the database along with corresponding information such as the type of sensor, a serial number, a date of purchase, and an identifier for the user who purchased the sensor (see 7.3). FIG. 9 shows features of a user interface for registering and managing purchased service and products according to one embodiment.

The remote server software may also check to see if there are any pre-existing sensors in the stock database that are unassigned to a user. If there are sensors that are unassigned, this means that the sensor has been built and is waiting to be assigned to a user. The unassigned sensors are then assigned to the user.

In various embodiments, according to further features (7.3; see, e.g., the embodiment of FIG. 9) a user may assign a sensor or a control module to his account after obtaining the sensor or control module from a retail store. For example, upon purchasing or receiving an external sensor and/or control module, a user may sign in to his account at the remote server using either a web page or an application on a mobile device, and use a GUI of the web page or application to add the new device to its account. In the case of a control module, the user may simply be required to provide a name for the control module and a serial number of the control module. In the case of an external sensor, the user may be required to provide a name, a serial number of the external sensor, and optionally the control module to be associated with the external sensor. Optionally, the control module may communicate to the remote server that the external sensor is associated to it upon connecting to the external sensor.

According to at least one embodiment, the external sensor's serial number corresponds to a MAC address.

In at least some embodiments, a Sensor Verification System takes the serial number of a newly registered external sensor as provided by the user on the website or the control module and compares it with the sensors issued for that user. If the sensor code matches the sensor code that is on file for that user, the sensor has been verified and is then able to be added to the user's account—otherwise, the sensor is not added to the account.

In at least some embodiments, external sensors are assigned to their respective users by a Sensor Registration System. If there is more than one sensor that has been purchased in an order by this user, the Sensor Registration System may assign all of the other sensors that the user has purchased to the user's account. In the event that the user has only purchased one sensor, the Sensor Registration System may register that sensor.

According to some embodiments, once the sensor has been successfully registered, it is then passed onto a Sensor Permissions System. In one embodiment, sensor permissions are implemented by adding information identifying the sensor to a sensor permissions table, along with the appropriate permission information. The permission holds information such as the user's preferences, alert settings, and information indicating who is allowed to modify this information.

Figure 10:
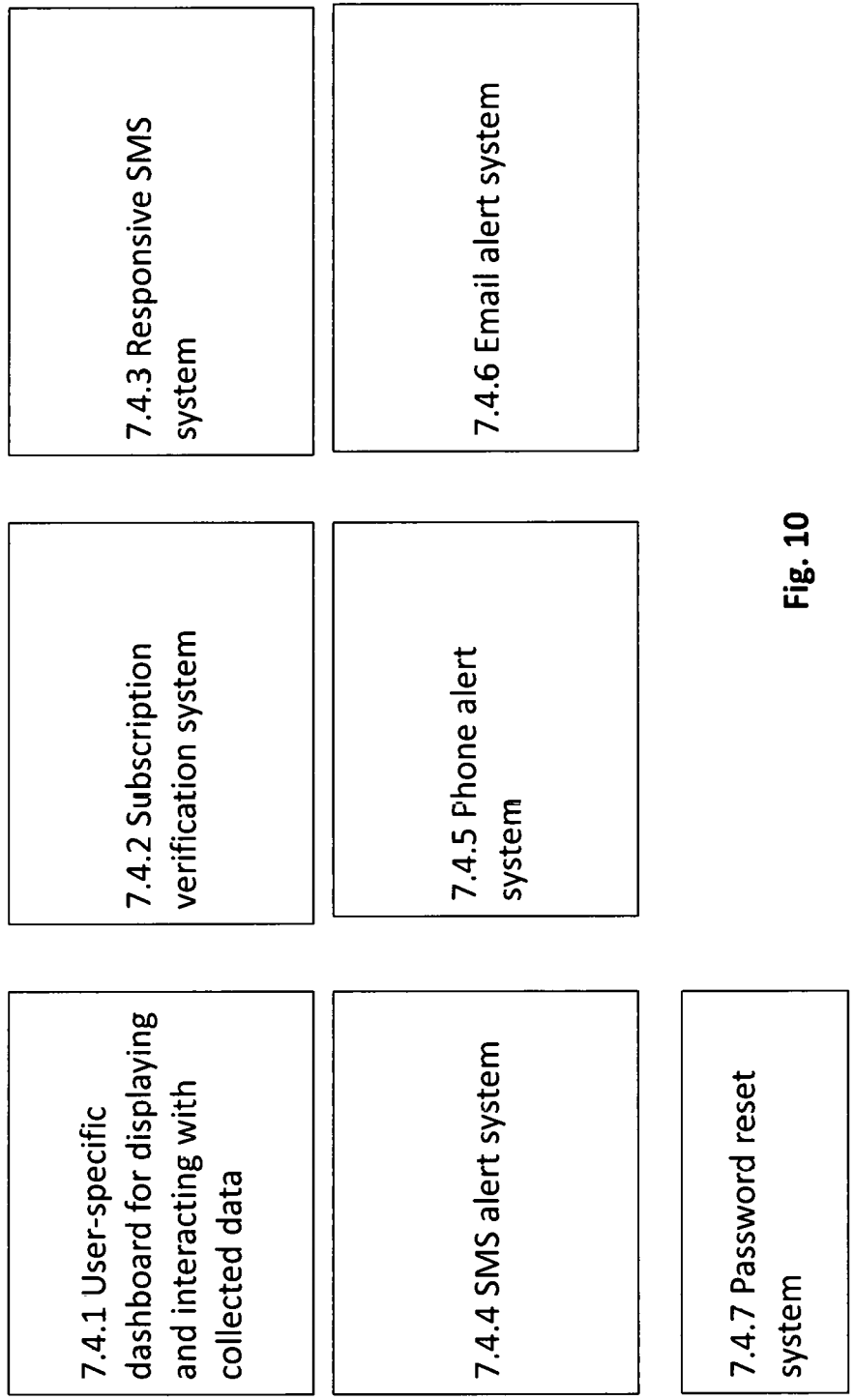
FIG. 10 is a block diagram of data management software at a remote server according to one embodiment.

According to at least one embodiment, the remote server may also provide an interface comprising a data dashboard (e.g., 7.4, see, e.g., the embodiment of FIG. 10). The dashboard may also be provided on an application of a mobile device based on data received from the remote server. This dashboard enables the user to interact with the data collected by each sensor associated to the user. According to at least one embodiment, the user-specific dashboard includes three sections: Overview, Detailed View, and My Account. Access to the data dashboard may be restricted to users who are authenticated using techniques known in the art.

The Overview section displays general information about the sensor that is most important to the user on a day-to-day basis. In an exemplary embodiment, this includes information such as the current water level, historical water depth values, and a graphical representation of water data. At 7.5, features are provided for interacting with the control module, collecting data, analyzing data, storing data, etc.

The Detailed View may provide more detailed graphs and analysis of the collected sensor data. This section may further include information such as sensor diagnostic information, line graphs of different sensor parameters, and in-depth analysis of sensor data.

The Detailed View section may also provide data that has been processed after having been received by the control module. For example, some raw data measured by the sensors may need some processing before being able to be presented as useful information to a user. In at least one embodiment, the raw data provided by sensors comprises top of the water pressure and bottom of the water pressure, and this data is processed at the remote server to compute a water level.

Figure 11:
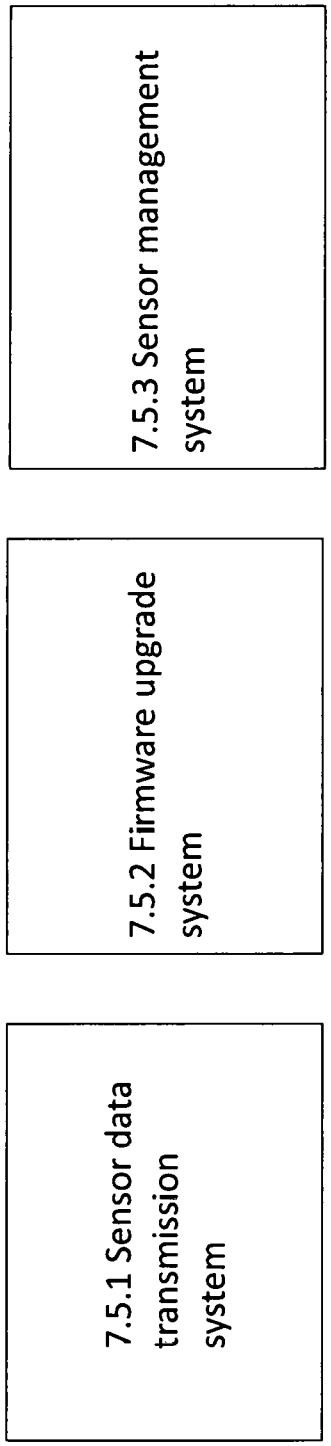
FIG. 11 is a block diagram of control module software according to one embodiment.

Further features may include software and database for interacting with the control modules and gathering and storing data, and upgrading firmware, as shown in FIG. 11.

In the My Account section, the user can manage their account. The user can see information such as the sensors they own, as well as their current subscription or payment status.

According to at least one embodiment, the data displayed in the data dashboard is filtered based on permissions of a user and permissions of the various sensors. The remote server may verify if a user has permission to access information about their sensors. In at least some embodiments, the remote server may further restrict access to data based on whether the user's payments are up to date.

The remote server may also comprise a Responsive SMS system. This system enables the user to text questions to a phone number that then uses software that sends a request to the remote server. The remote server then determines which user is associated to the phone number from which the text message originates, determines if the user is a new customer or a pre-existing customer via the database. If the user is found and has an active account, the received command is compared to a registry of known commands.

In at least some embodiments, the command may allow for parameters to be included. For example, a command may consist of a command name, followed by parameters like a control module name, or an external sensor name. In one non-limiting example, the received command is "waterlevel well1", where "waterlevel" is the command and well 1 is the parameter, identifying a control module installed on the user's well. Upon being received, the command is parsed and the "waterlevel" command is identified, and any parameters are extracted. Some commands may require parameters, while other commands may have optional parameters. For example, if the "waterlevel" command is received without a parameter, the response may include the water level of each well associated to the user. Otherwise, the command is interpreted based on the extracted parameters and an appropriate response is computed. The computed response is then returned to the user by SMS, or other appropriate means. In the case of an invalid command or an invalid parameter, an error message is returned instead.

In at least some embodiments, the remote server may also include an SMS Alert System for issuing sensor-specific alerts to the user. Such alerts may be used to inform the user of important information regarding their sensor. This includes alerts such as low water notification alerts, high water notification alerts, malfunction alerts, and other concerning sensor data. This system can be configured by the user in their user-specific dashboard.

Alerts are managed by the applications running on the remote server. When data received from a control module or sensor meets the alert conditions configured in the users account, then the application(s) running on the remote server initiate alerts to be sent to the users in the manner configured in the users account (text, voice, email, etc.).

In the example of an SMS alert via a third-party SMS delivery service, the SMS message may be customizable and include personalized greetings. The user can then use the responsive text system to order water or carry out other actions to help resolve the issue.

This system alerts the user of important information regarding their control module or sensor that they should be aware of. This includes, but is not limited to, the types of alerts issued by the SMS alert system.

In the example of a voice alert the web server issues a phone call to the number that has been specified by the user to receive alerts for that specific sensor. The phone call is customizable and includes personalized greetings.

In the example of an email, when sensor data has reached or surpassed the users notification level, the remote server initiates an email that issues a customized email alert to the user. The email may use formatting languages such as Hyper Text Markup Language (HTML).

According to at least one embodiment, the system involves the transmission of data from the sensors and the control module to the remote server. When the control module and external sensors connect to the remote server, the remote server determines whether this sensor or control module is new or simply connecting to upload data to the database. If the sensor or control module is new, it is registered using the sensor registration system. Provided that the sensor or control module is registered, the control module will then begin the process associated with uploading data to the web server.

In at least one embodiment, the transmitted data comprises all the raw data taken by each of the internal and external sensors associated to the control module since the last data upload occurred. The remote server being aware of the type and serial number of each sensor is able to interpret this data appropriately. In another embodiment, the transmitted data may be formatted by the control module in a standard format which is understood by the remote server.

Embodiments may employ a feature to manage/correct for clock drift, which ensures accuracy in logging time at which sensor measurements are made. An embodiment of such a feature is described in Example 4.

In at least one embodiment, before the data is uploaded to the sensor's respective table in the database, the sensor must go through some data validation processes. Once the sensor has been verified, the sensor sends a checksum value that helps to verify that the sensor transmission has not been corrupted or is otherwise invalid. In some embodiments, the checksum uses the MAC address of the sensor as well as other data parameters to calculate its value. During the control module's interaction with the remote server, the remote server also calculates the checksum value that was sent by the sensor. If the two checksum values are identical, the remote server lets the sensor upload its information into its respective table in the database.

The data transmission system also triggers the alert systems to look at the information that the sensor has passed to it to see if an alert should be issued.

This system looks at any warnings or errors that the sensors are encountering and sends reports to system administrators to warn them of potential problems.

In at least one embodiment the server works in conjunction with the control module/sensor to manage the version of software running on the control module/sensor. On command the server will download a software via the telecommunications/data network and restart the device such that it now runs the received version of software. This is often referred to "over the air" or OTA updates. In one embodiment, OTA updates are managed according to the scheme described in Example 5.

In at least one embodiment there is an ability to install or change software running on the control module/sensor by via a wired serial interface.

Communications with remote servers may implement encryption technologies (such as SSL/TLS, etc.)

Embodiments will be further described by way of the following non-limiting Examples.

Example 1. Power Management

A sensor device may employ one or more of the following features to minimize the electrical power need for operation, as follows:

1. The sensor device may operate on a sleep-wake cycle of a selected time period (e.g., on the order of minutes, hours, days, etc.), in which it wakes up, performs its function, then goes back to sleep again. During sleep it is not consuming power for processing or communication.
2. System components still receiving power while the device is asleep are selected so that they draw very little power.
3. System components receiving power while the device is awake are selected based on their low power consumption.
4. Additional components, such as WiFi circuitry, cellular communication circuitry, and sensor circuitry are all actively managed such that they are turned on when they need to be used, but otherwise turned off
5. Sensor readings are buffered, such that one communication session can send many readings, rather than initiating a communication session for each reading. In one embodiment, buffering is carried out according to the scheme described in Example 2.
6. When the battery power begins to get low (specific levels are defined, such as, e.g., 25%, 15%, 10%, etc.) the sensor device uses a combination of extending time between communication cycles and/or extending the duration of the sleep-wake cycle, to conserver power, while still continuing to gather and communicate data. The sensor device automatically returns to normal settings when power levels rise to normal levels (specific levels defined, such as, e.g., 30%, 40%, 50%, 60%, or higher).
7. If the battery has been sufficiently depleted for the sensor device to have turned itself off (according to battery protection circuitry and algorithm), and is now on again and in a power recovery mode, the sensor device collects data and saves it without sending to server, until it such time as the battery has sufficient charge to be able to establish communication with the server. At this time it exits power recovery mode and continues normal operation.

Example 2. Buffering Readings

A sensor device may "buffers" readings—i.e., save them to local memory for subsequent sending to the server, under one or more conditions such as:
1. In the event that communication with the server is not possible when a communication is attempted. This ensures data is not lost when it fails to send to the server.
2. To allow the sensor device to collect a number of readings, and send them as a batch during one communication event with the server, rather than having to connect to the server for every reading. This reduces power consumption, which has the benefit of providing longer run time, and reduces requirements of battery size, solar panel size, and the time that the solar panels are exposed to the sufficient light for power generation.

It will be appreciated that a sensor device does not have infinite memory, and cannot buffer readings indefinitely. Accordingly, embodiments may use a circular buffer within the non-volatile memory. A circular buffer strategy ensures that if more data needs to be stored than there is physical space to do so, then a user-selected strategy is employed to make room for new data records in memory. Examples of such user-selectable strategies, (which may be set up by the user in sensor device settings, web interface, etc.) include, but are not limited to:
1. Oldest data record is overwritten.
2. Oldest data records are averaged together such that two (or more) old data records become one. This averaging is handled such that records that have been previously consolidated in this manner can still be further consolidated properly. This option automatically provides indefinite storage with finite memory, but with reduced data frequency (e.g., readings every ten minutes instead of every five minutes).
3. Newest data records are overwritten.
4. No new data records are saved.

As an example, if the sensor device was using a sleep-wake cycle of five minutes, and a server communication cycle of one hour, it would collect readings every five minutes and store them in memory (circular buffer). Upon the twelfth sleep-wake cycle (i.e., after one hour) it connects to the server and sends all twelve records to the server using that one connection. Upon confirmation of the server receiving the records, they are then removed from the buffer.

However, if communication with the server failed for some reason, then the twelve records would not be deleted, but would be retained until the next time the sensor device communicates with the server (for example at the $24^{th}$ cycle). At this point in time when the device connects, it doesn't just send the latest twelve records, but also sends the previous twelve records.

Due to the fact that there could be more records to be sent at one time than is practical, the number of records sent at one time may be limited to a maximum. Hence if there are very many records in memory to send, the sensor device sends the data records in groups during each normal communication session with the server. The maximum number of records to send in one session may be calculated such that is more than the number of records normally generated between two successive server communication sessions, so that if there is a backlog of data to send, it will get sent.

In this way power consumption is significantly reduced, and system reliability and data preservation is significantly increased.

Example 3. Time Management—Time a Sensor Reading was Taken when Buffering Readings It is advantageous from a power consumption perspective to not have to run a real time clock the entire time the sensor device is in service, and also advantageous to not have to connect to a time server each time a sensor reading is made, to be able to obtain a timestamp for each reading. The following method may be used to achieve this.

The microcontroller incorporates a real time clock that enables it to keep track of the amount of time that has elapsed according to its clock while the microcontroller is awake. When the microcontroller sleeps for power saving purposes its clock is also turned off. However, to conserve power the device may operate in a mode where it buffers readings to local memory and only periodically communicates them to the server. In this mode, the sensor device needs to store the time and date of the reading along with the reading itself. This then presents a challenge—specifically how does the sensor device know the time and date of each successive reading, if the microcontroller has been asleep and its clock has not been running during this sleep time. To solve this problem the device may use the following approach:

1. Upon start up or wake up, if the sensor device does not have in memory a valid time and date that it last went to sleep and the duration of that sleep, then it connects to the server and obtains the current date and time. If this time cannot be obtained, the sensor device goes back to sleep for the remainder of the sleep-wake cycle (e.g., sleep for the remaining 250 seconds of a 300 second wake cycle). The sensor device then awakes and repeats this procedure starting with this step 1.
2. Obtain readings from sensors.
3. Using the date and time received from the server or the date and time the sensor device last went to sleep and duration of that sleep, and the amount of time that has elapsed between obtaining this date and time and taking the reading, calculate the date and time of the readings. Store this date and time with the reading.
4. Using the amount of time that has elapsed during the current wake cycle, calculate the amount of time the device needs to sleep to be able to wake up at the start of the next sleep-wake cycle. For example, if the sleep-wake cycle is set to 300 seconds, and the device took or will take 50 seconds to get the initial time (when needed), and take the readings, and do other processing needed before going back to sleep, then it calculates it will need to sleep for 300−50=250 seconds, so that it can wake up at the start of the next sleep-wake cycle.
5. Just prior to going to sleep, save this sleep duration and time the device started sleeping in memory that is preserved during the sleep cycle and go to sleep for the calculated amount of time.
6. Go to sleep for the calculated time, and upon waking up from sleep, return to step 1 above.

In this way, the time and date is known for each reading and is stored in the buffer as part of the data record for that reading. This solves the problem of the sensor device being able to record a time and date for each reading without needing the microcontroller clock to be running between readings, and without having to connect with a time server for each reading.

Example 4. Time Management—Managing Clock Drift

The method described in Example 3 for determining the timestamp of any particular reading, without having to run a clock during the sleep cycle, and without having to connect to a time server for each reading, may suffer from a problem of time synchronization. Specifically, if the clock in a sensor device runs a little faster or a little slower due to manufacturing variation, temperature variation, or other reasons, then its time can become out of sync with the server time. To resolve this problem the following time synchronization method may be utilized.

In addition to obtaining the time, and calculating the current time, for each sensor reading, the sensor device also obtains from the server the server's current date and time upon startup or after each posting of stored data. It then compares this server date and time (adjusted for current cycle run time) with the date and time the sensor device has calculated to be the current date and time based upon the last sleep time and duration and current runtime. If the clock is not in synchronization, then there will be a discrepancy between the two times. The device then calculates a ratio of sensor device clock speed to server clock speed, and adjusts all subsequent time calculations of the sensor device using this ratio such that calculated sensor device time stays in synchronization with the server.

However, just using this ratio to synchronize the clocks may not be sufficient, since by the time the sensor device determines that its clock speed is different from the server's clock speed, it has already accumulated some error in the sensor device time (where server time is defined as the "correct" time).

This error could be such that some time needs to be added to or deducted from the sensor device's clock. Simply adjusting the ratio to correct for this past accumulated error is not sufficient to resolve this problem, as correcting in this manner for past error will actually create future error.

Hence when a time difference is determined, in addition to calculating the clock ratio, adding or subtracting the necessary time from the sensor device clock is also done. Adding time to the sensor device clock is simple—if the device clock is for example 100 seconds behind the server clock, then 100 seconds is added to the server clock. Similarly if the sensor device clock is behind by, e.g., 300, 500, or any number of seconds.

However, deducting time from the sensor device clock needs to be specially handled, so that a deduction from the sensor device clock does not set the time back so far as to cause the next reading to have a timestamp prior to a previously recorded reading's timestamp. To accommodate this the sensor device spreads out the deduction of time over a number of readings if needed, each time deducting from the device clock a maximum amount of time that will ensure the subsequent reading doesn't have a timestamp prior to a previous reading. Once the total amount of time that needs to be deducted from the sensor device clock has occurred, no further deductions occur to correct for that past discrepancy.

Additionally, the ratio of the rates at which the sensor device and server clocks run is not assumed to be constant. The rate at which each clock runs may be affected by any number of factors such as manufacturing variance in server or sensor device clock, relativistic effects such as speed of motion of each clock, strength of gravitational field in which they operate, and any number of unknown causes. For this reason this method does not assume the ratio is constant and works for clocks regardless of the ratio between clocks being constant or not. Hence each time a new time is received from the server, the ratio and the time needed to be added or deducted is recalculated and applied.

Due to the power savings approach of turning the sensor device clock off during the sleep cycle, special consideration is given to not only how to adjust the rate of the sensor device clock while it runs, but also to adjust the duration of sleep time so that the sensor device wakes up at the correct time from the server clock's perspective. For example, if the sensor device clock is determined to run 10% faster than the server clock, then it is a matter of dividing the run time of the device since wake up by 1.1 to determine number of elapsed server seconds. However, suppose the sensor device has been running for 50 server seconds, out of the 300 server seconds of the sleep-wake cycle. Then to wake up at the proper time it needs to sleep for an additional 250 server seconds. However the sensor device can only be told to sleep for a certain number of "device seconds", not "server seconds". Hence the sleep time—i.e., 250 server seconds—is converted to device seconds by multiplying by 1.1, i.e., 1.1×250=275 seconds, and the sensor device is instructed to sleep for this amount of time. It may seem odd to increase the sleep time however, in this example the device clock is running 10% faster than the server clock, and hence when the sensor device sleeps for 275 seconds, it will actually wakeup after 275/1.1=250 server seconds, which is exactly the desired result.

To facilitate accuracy the timestamp received from the server clock may be, e.g., to the microsecond level.

In this way the sensor device clock is kept in close synchronization with the server clock, regardless of either clocks rate of run changing over time, and without having to keep the sensor device clock running during sleep mode, and without having to initiate any additional communication sessions with the server than would otherwise be implemented to send data to the server.

Example 5. OTA Firmware Updates

A sensor device may implement Over The Air (OTA) firmware update capabilities such that the firmware can automatically be changed/updated remotely (without a site visit) to implement new features and implement fixes or improvements.

The firmware updates can occur via either interface—i.e., over a WiFi connection or over a cellular connection. The method may be implemented as follows:

1. Sensor device connects with server in one of its normal communication sessions, and sends data. This data includes the firmware version the device is currently running.
2. The server then checks to see if a different version of firmware is available for this sensor device. Note, the different firmware could represent an upgrade or a downgrade of firmware. In this way not only can the update be a firmware upgrade, but also a firmware downgrade when desired.
3. If the server sees a new version of firmware is available it places a file in a server directory where the sensor device knows it can access the firmware, and gives the file a random name.
4. The server then communicates the new firmware version, the random name of the file, and the checksum value of the file to the sensor device. As a power saving feature, this communication may be done as part of the normal server response—i.e., not a separate communication session to communicate new firmware is available.
5. The sensor device then compares the new firmware version to its current firmware version. If they are not different, the sensor device does not initiate a firmware update. If they are different the sensor device initiates a firmware update. The sensor device may first confirm that sufficient battery power is available before initiating the firmware update.
6. Once a firmware update has been initiated the sensor device downloads the new file, and saves it in memory ready for the update process to be invoked. If the checksum doesn't match the update process is aborted, and the update process repeats on the next connection cycle.
7. Once a file has been successfully downloaded then it is installed as the new operating firmware and the sensor device restarts. The sensor device instructs the server that the temporary randomly named file can be deleted, and the server deletes it.

This method allows the firmware to update remotely, without the need to send a person to the sensor device site, and ensures that no partial, corrupt, unintended, or unauthorized firmware is installed.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A method for remote sensing of at least one property, comprising:
    disposing a sensor device in a location for sensing the at least one property, the sensor device including at least one sensor connected to a control module;
    implementing a control module power management sleep/wake cycle time period;
    using the control module to receive, during a wake portion of the sleep/wake cycle, at least one signal from the at least one sensor, the at least one signal corresponding to a reading of the at least one property;
    using the control module to set a communication interval, wherein the control module communicates the at least one reading to a server during the communication interval and the communication interval comprises an amount of time as determined by a number of sleep/wake cycles selected according to a threshold amount of power available from a power source;
    maintaining the at least one sensor obtaining readings of the at least one property according to the sleep/wake cycle;
    during an increased communication interval comprising an amount of time as determined by an increased number of sleep/wake cycles, buffering sensor readings such that two or more buffered sensor readings are communicated to the server during the increased communication interval.

2. The method of claim 1, comprising turning on communications circuitry only during a communication interval.

3. The method of claim 1, comprising the server:
    receiving, over a communications network, data from the control module, the data including the at least one reading of the at least one property by the at least one sensor;
    associating the received data with a user identifier;
    wherein associating the received data with the user identifier comprises registering a sensor identifier associated with the at least one sensor with the user identifier.

4. The method of claim 3, comprising:
    receiving, over the communications network, a request from a client device, the request being associated with the user identifier;
    transmitting a response to the client device, the response comprising at least some of the received data.

5. The method of claim 3, comprising:
    determining whether the received data satisfy a trigger condition;
    transmitting an alert to the client device, the alert indicating that the trigger condition is satisfied.

6. The method of claim 5, wherein the trigger condition is based on a value of the at least one property measured by the at least one sensor.

7. The method of claim 5, wherein the value is configurable via a configuration message from the client device.

8. The method of claim 3, comprising:
receiving, over the communications network, a command from a client device, the command being associated with the user identifier;
wherein the command indicates an action to be performed by the server or the control module relating to the at least one sensor.

9. The method of claim 1, wherein the at least one sensor comprises at least one of:
a pressure sensor;
a temperature sensor;
a humidity sensor;
a turbidity sensor;
a pH sensor;
an oxygen sensor;
a sensor for at least one gas.

10. The method of claim 9, comprising:
disposing a first pressure sensor above a water source and disposing a second pressure sensor at a bottom of a water source; and
determining a water depth from a reading of the first pressure sensor and a reading of the second pressure sensor.

11. The method of claim 10, wherein the water source is a well.

12. The method of claim 1, further comprising using the control module to increase the communication interval by an amount of time as determined by a number of sleep/wake cycles selected according to an amount of power available from the power source below the threshold amount.

13. A sensor device, comprising:
a control module including a communications subsystem;
at least one sensor connected to the control module and configured to measure at least one property of an environment surrounding the at least one sensor;
wherein the control module operates according to a power management sleep/wake cycle time period;
wherein the control module receives, during a wake portion of the sleep/wake cycle, at least one signal from the at least one sensor, the at least one signal corresponding to a reading of the at least one property;
wherein the control module communicates the at least one reading to a server during a communication interval and the communication interval comprises an amount of time as determined by a number of sleep/wake cycles selected according to a threshold amount of power available from a power source;
wherein the at least one sensor obtains readings of the at least one property according to the sleep/wake cycle;
wherein during an increased communication interval comprising an amount of time as determined by an increased number of sleep/wake cycles, sensor readings are buffered such that two or more buffered sensor readings are communicated to the server during the increased communication interval.

14. The sensor device of claim 13, wherein the power source comprises a battery.

15. The sensor device of claim 13, further comprising a solar panel that generates electrical power to charge the battery and/or to operate the sensor device.

16. The sensor device of claim 13, wherein the communications subsystem comprises at least one of a cellular communications module and a WiFi module.

17. The sensor device of claim 13, wherein the at least one sensor comprises at least one of:
a pressure sensor;
a temperature sensor;
a humidity sensor;
a turbidity sensor;
a pH sensor;
an oxygen sensor;
a sensor for at least one gas.

18. The sensor device of claim 13, comprising at least two sensors, including first and second pressure sensors.

19. The sensor device of claim 18,
wherein the first pressure sensor is configured to be disposed above a water source and the second pressure sensor is configured to be disposed at a bottom of a water source; and
wherein the property is a water depth obtained from a reading of the first pressure sensor and a reading of the second pressure sensor.

20. The sensor device of claim 19, wherein the water source is a well.

21. The apparatus of claim 13, wherein the control module increases the communication interval by an amount of time as determined by a number of sleep/wake cycles selected according to an amount of power available from the power source below the threshold amount.

* * * * *